UNITED STATES PATENT OFFICE 2,150,394

METHOD OF RECOVERING ZINC AND BARIUM FROM WASTE WATERS

Manfred Müller, Homberg, Germany, assignor to the firm Sachtleben Aktiengesellschaft für Bergbau und Chemische Industrie, Cologne-on-the-Rhine, Germany, a company of Germany No Drawing. Application October 20, 1936, Serial No. 106,568. In Germany November 16, 1935

14 Claims. (Cl. 134—78)

The present invention relates to a method of recovering zinc and barium from waste waters. The washing waters obtained in the lithopone industry frequently contain small amounts of zinc and barium in the form of zinc chloride and barium chloride. From economical reasons it would be desirous to recover the zinc and the barium in such waste waters by some simple treatment in a form as valuable as possible, even if the said substances are present in low concentration. It is in such case of particular advantage to precipitate the water-soluble zinc and barium compounds in the form of insoluble zinc sulfide and barium sulfate, since these substances again can be worked up to lithopone. As is known, however, if sulfuric acid or a water-soluble sulfate is added to a solution containing only small amounts of a barium compound, the solution will at once be made more or less turbid by the barium sulfate formed, which will remain in suspension for a long time and shows only little tendency to settle. The same occurs when a very dilute zinc solution is treated in similar manner. The precipitated zinc sulfide settles very slowly and incompletely, so that it is not possible, for instance by decantation, to separate economically the deposit from the filtrate. On account of this it was hitherto not possible to utilize the zinc and barium contents of the lithopone waste waters.

It has now been found, that the settling velocity of the precipitate consisting of zinc sulfide and barium sulfate can be highly increased by precipitating the zinc and the barium simultaneously. Hereby the barium sulfate formed will in statu nascendi be adsorbed by the voluminous zinc sulfide.

It has also been found, that the precipitate of zinc sulfide and barium sulfate obtained in this manner almost at once will settle in the form of large flakes, when traces of an aluminium compound, a magnesium compound, or an alkaline earth compound, are added to the precipitant and the Mg or Al ions are precipitated out in the form of the corresponding hydroxides simultaneously with zinc sulfide and barium sulfate. These compounds may also be added to waste water in minute amounts or, if they already are present in the water, part of the same may be precipitated simultaneously. In the practice for instance a highly diluted solution of barium sulfide and a solution of sodium sulfate containing small amounts of magnesium sulfate or aluminium sulfate may be caused to flow into the washing water simultaneously. The amount of precipitant used is so chosen, that the filtrate after it has been separated from the deposit will not react alkaline to phenolphthalein until small amounts of alkali have been added. When a mutual precipitation of $BaS+Na_2SO_4$ is prevented by suitable introduction of the precipitants, then the following conversions will take place:

$ZnCl_2+BaS=ZnS+BaCl_2$
$2BaCl_2+2Na_2SO_4=2BaSO_4+4NaCl$
$BaS+MgCl_2+2H_2O=Mg(OH)_2+BaCl_2+H_2S$.

The filtrate mainly contains sodium chloride, and the deposit is a blanc-fixe, which in accordance with the content of the washing water may contain up to 30% of zinc sulfide. This substance may with advantage be worked up to lithopones.

Example

To 1000 m³ of daily available washing waters having an average content of 0.35 g. Zn, 1.5 g. $BaCl_2$ and 0.2 g. Mg per litre, in a vessel equipped with a stirring device, a solution of barium sulfide and a solution of sodium sulfate of 5° Bé. are added simultaneously and continuously and the fluid is conducted into a settling tank. The two precipitants are suitably introduced into the first named vessel at different points at the bottom of the same. The supply of barium sulfide is so controlled, that one litre of the filtrate will not react alkaline to phenolphthalein until 2–3 cm.³ of a $n/10$ solution of potassium hydroxide has been added. The supply of sodium sulfate solution is so controlled, that the filtrate at a small excess of sulfate will be free from barium ions. The obtained precipitate settles immediately and may be separated from the clear filtrate in known manner by decantation, whereupon it may be worked up to lithophone.

I claim:

1. A method of recovering zinc and barium inorganic water soluble salts from waste waters containing such very small proportions of these substances in solution as will not precipitate in accordance with the conventional procedure for the precipitation of lithopone comprising adding as precipitants solutions of barium sulfide and sodium sulfate simultaneously and separately to the waste water, and separating the resulting precipitate from the liquid.

2. A method according to claim 1 in which small amounts of a substance from the group consisting of water soluble inorganic compounds of aluminium, magnesium and the alkaline earths, excepting barium compounds are also added to one of the reactants at any stage of the process prior to precipitation.

3. A method of recovering zinc and barium inorganic water soluble salts from waters lithopone waste containing such very small proportions of these substances in solution as will not precipitate in accordance with the conventional procedure for the precipitation of lithopone comprising adding as precipitants solutions of barium sulfide and sodium sulfate simultaneously but separately, and separating the resulting precipitate from the liquid.

4. A method of recovering zinc and barium inorganic water soluble salts from waste waters which contain such very small proportions of these substances in solution as will not precipitate in accordance with the conventional procedure for the precipitation of lithopone and are free from soluble aluminium compounds, magnesium compounds, and soluble alkaline earth compounds excepting barium compounds comprising adding as precipitants solutions of barium sulfide and sodium sulfate simultaneously but separately and also small amounts of a substance from the group consisting of water soluble inorganic compounds of aluminum, magnesium and the alkaline earths excepting barium compounds, and separating the resulting precipitate from the liquid.

5. A method of recovering zinc and barium inorganic water soluble salts from waste waters which contain such very small proportions of these substances in solution as will not precipitate in accordance with the conventional procedure for the precipitation of lithopone and are free from soluble aluminium compounds and soluble alkaline earth compounds excepting barium compounds comprising adding as precipitants solutions of barium sulfide and sodium sulfate simultaneously but separately and also small amounts of a soluble alkaline earth salt other than barium, and separating the resulting precipitate from the liquid.

6. The method according to claim 5 in which the added salt is magnesium sulfate.

7. A method of recovering zinc and barium inorganic water soluble salts from waste waters which contain such very small proportions of these substances in solution as will not precipitate in accordance with the conventional procedure for the precipitation of lithopone and are free from soluble aluminium compounds and soluble alkaline earth compounds excepting barium compounds comprising adding as precipitants solutions of barium sulfide and sodium sulfate simultaneously but separately and also small amounts of aluminium sulfate, and separating the resulting precipitate from the liquid.

8. A method according to claim 5 in which the added alkaline earth compound is added to one of the precipitants.

9. A method according to claim 7 comprising adding the aluminium sulfate to one of the precipitants.

10. A method according to claim 5 in which the added alkaline earth compound is added to the solution of sodium sulfate.

11. A method according to claim 7 comprising adding the aluminium compound to the solution of sodium sulfate.

12. A method of recovering zinc and barium inorganic water soluble salts from lithopone waste waters containing such very small proportions of these substances in solution as will not precipitate in accordance with the conventional procedure for the precipitation of lithopone comprising adding as precipitants solutions of barium sulfide and sodium sulfate simultaneously but separately and separating the resulting precipitate from the filtrate, the amount of barium sulfide added being controlled by analysis of the filtrate to ascertain that it does not react alkaline to phenolphthalein until small amounts of alkali have been added thereto, the amount of sodium sulfate being controlled by analysis of separate filtrate samples to ascertain that a small excess of sulfates are present in the absence of barium ions.

13. The method of recovering zinc and barium inorganic water soluble salts from waste waters containing such very small proportions of these substances in solution as will not precipitate in accordance with the conventional procedure for the precipitation of lithopone comprising adding as precipitants solutions of barium sulfide and sodium sulfate simultaneously but separately to the waters at different points of the reaction vessel so that a mutual precipitation of the precipitants is avoided.

14. A method according to claim 13 in which small amounts of a soluble alkaline earth compound other than barium compounds are added.

MANFRED MÜLLER.